(12) United States Patent
Li et al.

(10) Patent No.: US 12,502,405 B2
(45) Date of Patent: Dec. 23, 2025

(54) CHIMERIC ANTIGEN RECEPTOR FOR RECOGNIZING Fc FRAGMENT AND APPLICATION THEREOF

(71) Applicant: SHENZHEN IN VIVO BIOMEDICINE TECHNOLOGY LIMITED COMPANY, Guangdong (CN)

(72) Inventors: Peng Li, Guangdong (CN); Yuanbin Cui, Guangdong (CN); Zhaoyang Tang, Guangdong (CN); Shanglin Li, Guangdong (CN); Yao Yao, Guangdong (CN); Simiao Lin, Guangdong (CN)

(73) Assignee: SHENZHEN IN VIVO BIOMEDICINE TECHNOLOGY LIMITED COMPANY, Guangdong (CN)

( * ) Notice: Subject to any disclaimer, the term of this patent is extended or adjusted under 35 U.S.C. 154(b) by 714 days.

(21) Appl. No.: 17/795,172

(22) PCT Filed: Oct. 21, 2020

(86) PCT No.: PCT/CN2020/122310
§ 371 (c)(1),
(2) Date: Jul. 25, 2022

(87) PCT Pub. No.: WO2022/032864
PCT Pub. Date: Feb. 17, 2022

(65) Prior Publication Data
US 2023/0256016 A1 Aug. 17, 2023

(30) Foreign Application Priority Data

Aug. 14, 2020 (CN) .......................... 202010818519.6

(51) Int. Cl.
| | |
|---|---|
| *A61K 40/31* | (2025.01) |
| *A61K 35/17* | (2015.01) |
| *A61K 40/11* | (2025.01) |
| *A61K 40/42* | (2025.01) |
| *A61P 35/00* | (2006.01) |
| *C12N 5/0783* | (2010.01) |

(52) U.S. Cl.
CPC .............. *A61K 35/17* (2013.01); *A61K 40/11* (2025.01); *A61K 40/31* (2025.01); *A61K 40/4224* (2025.01); *A61P 35/00* (2018.01); *C12N 5/0636* (2013.01); *A61K 2239/31* (2023.05); *A61K 2239/38* (2023.05); *A61K 2239/59* (2023.05)

(58) Field of Classification Search
None
See application file for complete search history.

(56) References Cited

U.S. PATENT DOCUMENTS

| | | | |
|---|---|---|---|
| 2015/0139943 A1* | 5/2015 | Campana | C07K 16/2887 424/174.1 |
| 2018/0133252 A9* | 5/2018 | Wilson | C12N 15/86 |
| 2019/0106501 A1 | 4/2019 | Press et al. | |
| 2019/0263928 A1 | 8/2019 | Watanabe et al. | |
| 2022/0000917 A1* | 1/2022 | Klichinsky | C07K 14/70517 |

FOREIGN PATENT DOCUMENTS

| | | | |
|---|---|---|---|
| CN | 107074969 A | 8/2017 | |
| CN | 110201158 A | 9/2019 | |
| CN | 110204619 A * | 9/2019 | ............. A61K 35/17 |
| CN | 110616191 A | 12/2019 | |
| CN | 110684739 A | 1/2020 | |
| CN | 110204619 B | 6/2020 | |
| CN | 111349178 A | 6/2020 | |
| WO | WO-2018017649 A1 * | 1/2018 | ......... C07K 16/2896 |
| WO | 2018064626 A1 | 4/2018 | |
| WO | 2019/222796 A1 | 11/2019 | |

OTHER PUBLICATIONS

English translation of CN110204619B, downloaded May 15, 2025. (Year: 2025).*
WIPO translation of CN110204619, pp. 1-54, and drawing pp. 28-48 (2025). (Year: 2025).*
Global Dossier translation of CN110204619, pp. 1-33 and drawing pp. 28-48 (2025). (Year: 2025).*
Kiyoshi et al., Nat Commun. Apr. 30, 2015;6:6866. (Year: 2015).*
Rataj et al. (British Journal of Cancer (2019) 120:79-87). (Year: 2019).*
Caratelli et al. (Int J Cancer. Jan. 1, 2020;146(1):236-247). (Year: 2020).*
D'aloia et al. (Cytotherapy, 2016; 18: 278-290). (Year: 2016).*
Motz et al. (Cancer Res (2017) 77 (13_Supplement): 3762, 1 page). (Year: 2017).*

(Continued)

*Primary Examiner* — Zachary S Skelding
(74) *Attorney, Agent, or Firm* — ArentFox Schiff LLP; Daniel W. Clarke

(57) ABSTRACT

A chimeric antigen receptor for recognizing an Fc fragment and an application thereof. The chimeric antigen receptor comprises an antigen binding domain, a transmembrane domain, and an intracellular costimulatory signal transduction domain. The antigen binding domain comprises an Fcγ receptor extracellular domain. According to the present invention, the Fcγ receptor extracellular domain is used as the antigen binding domain of the chimeric antigen receptor, so that the prepared CAR-T cell can recognize the Fc fragment of an antibody, and achieve, when used in combination with a tumor therapeutic antibody containing an IgG1 or IgG3 Fc fragment, an ADCC effect similar to that of natural immune cells such as NK cells; even in the case that antigen loss occurs in tumor cells, the CAR-T can also be used in combination with an antibody for recognizing another target to achieve an efficient killing effect on the tumor cells.

21 Claims, 3 Drawing Sheets

Specification includes a Sequence Listing.

(56) References Cited

OTHER PUBLICATIONS

Hickman et al. (Blood, (Dec. 7, 2017) vol. 130, No. Suppl. 1, pp. 3189. Meeting Info.: 59th Annual Meeting of the American-Society-of-Hematology (ASH). Atlanta, GA, USA. Dec. 9-12, 2017, 1 page). (Year: 2017).*
Judge et al. (Cancer Immunology Research, (Mar. 2017) vol. 5, No. 3, Supp. Supplement 1. Abstract No. A77, 1 page). (Year: 2017).*
Cheema et al. (Cancer Research, (Jul. 2017) vol. 77, No. 13, Supp. Supplement 1. Abstract No. 4605., 1 page). (Year: 2017).*
Extended European Search Report for European Patent Application No. 20949358.4 dated May 2, 2024, 7 pages.
Chen, Y., "Gene-modified NK-92MI cells expressing a chimeric CD16-BB-ζ or CD64-BB-ζ receptor exhibit enhanced cancer-killing ability in combination with therapeutic antibody," Oncotarget, 2017, vol. 8, No. 23, pp. 37128-37139.
D'Aloia, M. et al., "T lymphocytes engineered to express a CD16-chimeric antigen receptor redirect T-cell immune responses against immunoglobulin G-opsonized target cells," Cytotherapy, 2015, col. 18, No. 2, pp. 278-290.
Kudo, K., et al., "T Lymphocytes Expressing a CD16 Signaling Receptor Exert Antibody-Dependent Cancer Cell Killing," Cancer Research, 2014, vol. 73 No. 1, pp. 93-103.
Kudo, K., et al., "T Lymphocytes Expressing a CD16 Signaling Receptor Exert Antibody-Dependent Cancer Cell Killing of Multiple Tumor Types," Cancer Research, 2014, vol. 73 No. 1, Supplementary material, pp. 1-10.
Liu, B., et al., "New concepts and techniques in special infection surgery," 2017, pp. 311-314.
Caratelli et al., "FCγ Chimeric Receptor-Engineered T Cells: Methodology, Advantages, Limitations, and Clinical Relevance," Frontiers in Immunology, vol. 8, No. 457, Apr. 2017, pp. 1-8.
English Translation of the First Search Report of CN Application No. 202010818519.6 filed on Aug. 14, 2020.
First Office Action of CN Application No. 202010818519.6 mailed on Mar. 17, 2022, along with English language translation thereof.
International Search Report of PCT Application No. PCT/CN2020/122310 mailed on Mar. 18, 2021, along with English language translation thereof.

\* cited by examiner

CHIMERIC ANTIGEN RECEPTOR FOR RECOGNIZING Fc FRAGMENT AND APPLICATION THEREOF

CROSS-REFERENCE TO RELATED APPLICATIONS

This application is a National Stage Application, filed under 35 U.S.C. § 371, of International Application No. PCT/CN2020/122310, filed Oct. 21, 2020, which claims the benefit of priority under 35 U.S.C. § 119 to CN application No. 202010818519.6, filed Aug. 14, 2020, each of which is incorporated herein by reference in its entirety.

SEQUENCE LISTING

The instant application contains a Sequence Listing which has been submitted electronically in ASCII format and is hereby incorporated by reference in its entirety. Said ASCII copy, created on Jul. 21, 2022 is named 51766-506N01US_ST25_Sequence.txt and is 19 KB in size.

TECHNICAL FIELD

The present application belongs to the field of immunology and relates to a chimeric antigen receptor for recognizing an Fc fragment and an application thereof, in particular, to a chimeric antigen receptor for recognizing an Fc fragment, a T cell expressing the chimeric antigen receptor, a preparation method therefor and an application thereof in the preparation of a tumor therapeutic drug.

BACKGROUND

Chimeric antigen receptor (CAR) T cells, referred to as CAR-T, refer to the technology that the variable region of an immunoglobulin and the constant region of a T-cell receptor (TCR) are fused by genetic engineering and expressed on T cells so that T cells can recognize specific antigens and be activated. Up to now, the CAR-T technology can be roughly divided into three generations. In the first-generation CAR-T technology, a single-chain antibody is linked with the immunoreceptor tyrosine-based activation motif (ITAM, which is an important component responsible for intracellular signal transduction) of a CD3ζ chain through a transmembrane region. In the second-generation CAR-T technology, on the basis of the first-generation CAR-T, the intracellular domain of a co-stimulatory molecule such as CD28 or 4-1BB is introduced into the ITAM. In the third-generation CAR-T technology, intracellular domains of several co-stimulatory molecules are introduced into the ITAM. The above modifications in CAR molecules mainly focus on the signal transduction region of the intracellular domain.

In recent years, a new design scheme for CAR-T cells has emerged. For example, there are SUPRA-CAR-T cells designed by Wilson W. Wong et al., in which the extracellular domain of a conventional CAR molecule is split into two Zip fragments that can combine with each other, one Zip fragment is fixed on T cells, and the other Zip fragment is free outside T cells, so that the same CAR-T cells can recognize different antigens by changing the free Zip fragment, the activation intensity of T cells can be regulated by changing the type and combination of the free Zip fragment, and there are selection functions of "AND", "OR" and "NOT" for the recognition of various antigens. However, the structure of such CAR-T cells is very complex, the antibody matching these CAR-T cells is still not available on the market and is still in the clinical trial stage, and its safety needs to be evaluated. The extracellular domain of the conventional CAR molecule is mostly derived from the scFv segment of a xenogeneic antibody, has certain immunogenicity and can be cleared by immune cells, which is not conducive to the long-term survival of CAR-T cells in vivo.

It has been found that immune cells in the tumor immune microenvironment can function by mediating antibody-dependent cell-mediated cytotoxicity (ADCC) in many links of monoclonal antibody killing tumor cells. The ADCC refers to the mechanism that natural killer (NK) cells, macrophages and neutrophils expressing IgG Fc receptors kill target cells by binding to the Fc segment of the IgG antibody that has already bound to the surface of the target cells such as virus-infected cells or tumor cells, among which the NK cells are the main cells that achieve the ADCC effect. In the process of antibody-mediated ADCC, antibodies only specifically bind to the corresponding epitopes on target cells, and the NK cells and other effector cells can kill any target cells that bind to antibodies. The ADCC has been proved to be an important mechanism and means of monoclonal antibodies in clinical treatment of tumors, and the monoclonal antibodies that have been put into clinical application are: rituximab monoclonal antibody and novel anti-CD20 monoclonal antibody, trastuzumab monoclonal antibody, cetuximab monoclonal antibody, edrecolomab monoclonal antibody, nimotuzumab monoclonal antibody and gemtuzumab ozogamicin monoclonal antibody, all of which have the ADCC anti-tumor effect.

Therefore, in order to further improve the killing effect of CAR-T cells on the tumor, reduce the immunogenicity of CAR molecules and prolong the circulation time of CAR-T cells in vivo, it is necessary to further modify CAR molecules.

SUMMARY

The present application provides a chimeric antigen receptor for recognizing an Fc fragment and an application thereof. The chimeric antigen receptor can recognize the Fc fragment, and the CAR-T cell prepared from the chimeric antigen receptor can achieve, when used in combination with a tumor therapeutic antibody, an ADCC effect similar to that of natural immune cells such as NK cells and clear tumor cells combined with antibodies and has low immunogenicity and long circulation time in vivo.

In a first aspect, the present application provides a chimeric antigen receptor. The chimeric antigen receptor includes an antigen binding domain, a transmembrane domain, and an intracellular co-stimulatory signal transduction domain.

The antigen binding domain includes an Fcγ receptor extracellular domain.

In the present application, the antigen binding domain of the chimeric antigen receptor is the Fcγ receptor extracellular domain so that the prepared CAR-T cell can recognize the Fc fragment of an antibody, and achieve, when used in combination with a tumor therapeutic antibody, an ADCC effect similar to that of natural immune cells such as NK cells; even in the case that antigen loss occurs in tumor cells, the CAR-T can also clear tumor cells combined with antibodies and achieve an efficient killing effect on the tumor cells.

In the present application, the antigen binding domain of the chimeric antigen receptor is a human Fcγ receptor extracellular domain that basically has no immunogenicity so that the prepared CAR-T cell has high safety and long circulation time in vivo.

In the present application, the chimeric antigen receptor has the advantages of simple design and simple structure, has no restriction on the types of antibodies used in combination and can be used in combination with different antibodies to recognize different tumor surface antigens, and there is no need to carry out additional modification on T cells or tumor therapeutic antibodies, which is beneficial to achieving industrial application.

In some specific embodiments, the Fcγ receptor extracellular domain includes any one of a CD64a extracellular domain, a CD64b extracellular domain, a CD32a extracellular domain, a CD32b extracellular domain, a CD16a extracellular domain or a CD16b extracellular domain.

In some more specific embodiments, the CD64a extracellular domain includes an amino acid sequence as shown in SEQ ID NO: 1;

the CD64b extracellular domain includes an amino acid sequence as shown in SEQ ID NO: 1;

the CD32a extracellular domain includes an amino acid sequence as shown in SEQ ID NO: 3;

the CD32b extracellular domain includes an amino acid sequence as shown in SEQ ID NO: 4;

the CD16a extracellular domain includes an amino acid sequence as shown in SEQ ID NO: 5; and the CD16b extracellular domain includes an amino acid sequence as shown in SEQ ID NO: 6;

wherein, SEQ ID NO: 1 is the amino acid sequence of an FCGR1A (CD64A) extracellular domain:

```
SEQ ID NO: 1 is the amino acid sequence of an
FCGR1A (CD64b) extracellular domain:
QVDTTKAVITLQPPWVSVFQEETVTLHCEVLHLPGSSSTQWFLNGTATQ

TSTPSYRITSASVNDSGEYRCQRGLSGRSDPIQLEIHRGWLLLQVSSRV

FTEGEPLALRCHAWKDKLVYNVLYYRNGKAFKFFHWNSNLTILKTNISH

NGTYHCSGMGKHRYTSAGISVTVKELFPAPVLNASVTSPLLEGNLVTLS

CETKLLLQRPGLQLYFSFYMGSKTLRGRNTSSEYQILTARREDSGLYWC

EAATEDGNVLKRSPELELQVLGLQLPTPVWFH;

SEQ ID NO: 2 is the amino acid sequence of an
FCG1B (CD64b) extracellular domain:
MWFLTTLLLWVPVDGQVDTTKAVITLQPPWVSVFQEETITLHCEVLHLP

GSSSTQWFLNGTATQTSTPSYRITSASVNDSGEYRCQRGLSGRSDPIQL

EIHRGWLLLQVSSRVFMEGEPLALRCHAWKDKLVYNVLYYRNGKAFKFF

HWNSNLTILKTNISHNGTYHCSGMGKHRYTSAGISQYTVKGLQLPTPVW

FH;

SEQ ID NO: 3 is the amino acid sequence of an
FCG2A (CD32a) extracellular domain:
MTAKMETTFYDDALNASFLPSESGPYGYSNPKILKQSMTLNLADPVGSL

KPHLRAKNSDLLTSPDVGLLKLASPELERLIIQSSNGHITTTPTPTQFL

CPKNVTDEQEGFAEGFVRALAELHSQNTLPSVTSAAQPVNGAGMVAPAV

ASVAGGSGSGGFSASLHSEPPVYANLSNFNPGALSSGGGAPSYGAAGLA

FPAQPQQQQQPPHHLPQQMPV;
```

-continued
```
SEQ ID NO: 4 is the amino acid sequence of an
FCG2B (CD32b) extracellular domain:
MGILSFLPVLATESDWADCKSPQPWGHMLLWTAVLFLAPVAGTPAAPPK

AVLKLEPQWINVLQEDSVTLTCRGTHSPESDSIQWFHNGNLIPTHTQPS

YRFKANNNDSGEYTCQTGQTSLSDPVHLTVLSEWLVLQTPHLEFQEGET

IVLRCHSWKDKPLVKVTFFQNGKSKKFSRSDPNFSIPQANHSHSGDYHC

TGNIGYTLYSSKPVTITVQAP;

SEQ ID NO: 5 is the amino acid sequence of an
FCG3A (CD16a) extracellular domain:
MWQLLLPTALLLLVSAGMRTEDLPKAVVFLEPQWYRVLEKDSVTLKCQG

AYSPEDNSTQWFHNESLISSQASSYFIDAATVDDSGEYRCQTNLSTLSD

PVQLEVHIGWLLLQAPRWVFKEEDPIHLRCHSWKNTALHKVTYLQNGKG

RKYFHHNSDFYIPKATLKDSGSYFCRGLFGSKNVSSETVNITITQGLAV

STISSFFPPGYQ;

SEQ ID NO: 6 is the amino acid sequence of an
FCG3B (CD16b) extracellular domain:
MWQLLLPTALLLLVSAGMRTEDLPKAVVFLEPQWYSVLEKDSVTLKCQG

AYSPEDNSTQWFHNENLISSQASSYFIDAATVNDSGEYRCQTNLSTLSD

PVQLEVHIGWLLLQAPRWVFKEEDPIHLRCHSWKNTALHKVTYLQNGKD

RKYFHHNSDFHIPKATLKDSGSYFCRGLVGSKNVSSETVNITITQGLAV

STIS.
```

In some specific embodiments, the transmembrane domain includes a CD8 transmembrane domain and/or a CD28 transmembrane domain.

In some more specific embodiments, the CD8 transmembrane domain includes an amino acid sequence as shown in SEQ ID NO: 7;

```
SEQ ID NO: 7:
IYIWAPLAGTCGVLLLSLVITLYC.
```

In some more specific embodiments, the CD28 transmembrane domain includes an amino acid sequence as shown in SEQ ID NO: 8;

```
SEQ ID NO: 8:
IEVMYPPPYLDNEKSNGTIIHVKGKHLCPSPLFPGPSKPFWVLVVVGGV
LACYSLLVTVAFIIFWV.
```

In some specific embodiments, the intracellular co-stimulatory signal transduction domain includes any one or a combination of at least two of a CD28 intracellular domain, a 41BB intracellular domain, CD3ζ, TLR2, TLR1, CD27, OX40 or DAP10, preferably a combination of a 41BB intracellular domain and CD35 or a combination of a CD28 intracellular domain and CD3ζ.

In some more specific embodiments, the 41BB intracellular domain includes an amino acid sequence as shown in SEQ ID NO: 9;

```
SEQ ID NO: 9:
KRGRKKLLYIFKQPFMRPVQTTQEEDGCSCRFPEEEEGGCEL.
```

In some more specific embodiments, the CD28 intracellular domain includes an amino acid sequence as shown in SEQ ID NO: 10;

```
SEQ ID NO: 10:
RSKRSRLLHSDYMNMTPRRPGPTRKHYQPYAPPRDFAAYRS.
```

In some more specific embodiments, the CD32 includes an amino acid sequence as shown in SEQ ID NO: 11;

```
SEQ ID NO: 11:
RVKFSRSADAPAYQQGQNQLYNELNLGRREEYDVLDKRRGRDPEMGGKP

RRKNPQEGLYNELQKDKMAEAYSEIGMKGERRRGKGHDGLYQGLSTATK

DTYDALHMQALPPR.
```

In some preferred embodiments, the chimeric antigen receptor further includes a Linker region between the antigen binding domain and the transmembrane domain.

In some specific embodiments, the Linker region includes a Hinge region and an IgG constant region, where the IgG constant region includes CH2 and/or CH3;

In the present application, a Linker region is arranged between the antigen binding domain and the transmembrane domain of the chimeric antigen receptor, ensuring that the Fcγ receptor extracellular domain that is used as the antigen binding domain is expressed on the surface of a T cell membrane and improving the recognition efficiency of an antibody Fc segment by CAR-T cells.

In some more specific embodiments, the Hinge region includes an amino acid sequence as shown in SEQ ID NO: 12;

```
SEQ ID NO: 12:
GGGSSGGGS.
```

In some more specific embodiments, the CH2 includes an amino acid sequence as shown in SEQ ID NO: 13;

```
SEQ ID NO: 13:
APEFLGGPSVFLFPPKPKDTLMISRTPEVTCVVVDVSQEDPEVQFNWYV

DGVEVHNAKTKPREEQFNSTYRVVSVLTVLHQDWLNGKEYKCKVSNKGL

PSSIEKTISKAK.
```

In some more specific embodiments, the CH3 includes an amino acid sequence as shown in SEQ ID NO: 14;

```
SEQ ID NO: 14:
GGQPREPQVYTLPPSRDELTKNQVSLTCLVKGFYPSDIAVEWESNGQPE

NNYKTTPPVLDSDGSFFLYSKLTVDKSRWQQGNVFSCSVMHEALHNHYT

QKSLSLSPGK.
```

In some preferred embodiments, the chimeric antigen receptor further includes a signal peptide, where the signal peptide includes any one of a GM-CSF signal peptide, an IL-2 signal peptide, a CD8α signal peptide or an IL-6 signal peptide.

In some specific embodiments, the GM-CSF signal peptide includes an amino acid sequence as shown in SEQ ID NO: 15;

```
SEQ ID NO: 15:
METDTLLLWVLLLWVPGSTG.
```

In some specific embodiments, the IL-2 signal peptide includes an amino acid sequence as shown in SEQ ID NO: 16;

```
SEQ ID NO: 16:
MYRMQLLSCIALSLALVTNS.
```

In some specific embodiments, the CD8α signal peptide includes an amino acid sequence as shown in SEQ ID NO: 17;

```
SEQ ID NO: 17:
MALPVTALLLPLALLLHAARP.
```

In some specific embodiments, the IL-6 signal peptide includes an amino acid sequence as shown in SEQ ID NO: 18;

```
SEQ ID NO: 18:
MNSFSTSAFGPVAFSLGLLLVLPAAFPAP.
```

In a second aspect, the present application provides a nucleic acid molecule encoding the chimeric antigen receptor as described in the first aspect.

In a third aspect, the present application provides an expression vector. The expression vector includes the nucleic acid molecule as described in the second aspect.

In some preferred embodiments, the expression vector includes a viral vector.

In some preferred embodiments, the viral vector includes any one of a lentiviral vector, a retroviral vector or an adeno-associated viral vector, preferably a lentiviral vector.

In a fourth aspect, the present application provides a recombinant lentivirus. The recombinant lentivirus is prepared by co-transfecting mammalian cells with the expression vector as described in the third aspect and a packaging helper plasmid.

Preferably, the mammalian cells include any one or a combination of at least two of 293 cells, 293T cells or 293F cells.

In a fifth aspect, the present application provides a chimeric antigen receptor T cell. The chimeric antigen receptor T cell expresses the chimeric antigen receptor as described in the first aspect.

In a sixth aspect, the present application provides a preparation method of the chimeric antigen receptor T cell as described in the fifth aspect. The preparation method includes the step of introducing the nucleic acid molecule as described in the second aspect, the expression vector as described in the third aspect or the recombinant lentivirus as described in the fourth aspect into a T cell.

In a seventh aspect, the present application provides a pharmaceutical composition. The pharmaceutical composition includes any one or a combination of at least two of the chimeric antigen receptor as described in the first aspect, the nucleic acid molecule as described in the second aspect, the expression vector as described in the third aspect, the recombinant lentivirus as described in the fourth aspect or the chimeric antigen receptor T cell as described in the fifth aspect.

In some preferred embodiments, the pharmaceutical composition further includes an antibody drug.

In some preferred embodiments, the pharmaceutical composition includes an antibody containing an IgG1 and/or IgG3 Fc fragment.

In the present application, the CAR-T cell achieves an ADCC effect similar to that of natural immune cells such as NK cells by recognizing the Fc fragment of a tumor therapeutic antibody and thus has no restriction on the types of tumor therapeutic antibodies used in combination, and any tumor therapeutic antibodies of IgG1 and IgG3 types can be used in combination with the CAR-T cells of the present application to achieve a tumor-killing function. For example, the antibody drug includes any one or a combination of at least two of rituximab monoclonal antibody, anti-CD20 monoclonal antibody, trastuzumab monoclonal antibody, cetuximab monoclonal antibody, edrecolomab monoclonal antibody, nimotuzumab monoclonal antibody or a gemtuzumab ozogamicin monoclonal antibody.

In some preferred embodiments, the pharmaceutical composition further includes any one or a combination of at least two of a pharmaceutically acceptable carrier, an excipient or a diluent.

In an eighth aspect, the present application provides an application of the chimeric antigen receptor as described in the first aspect, the nucleic acid molecule as described in the second aspect, the expression vector as described in the third aspect, the recombinant lentivirus as described in the fourth aspect, the chimeric antigen receptor T cell as described in the fifth aspect or the pharmaceutical composition as described in the seventh aspect in the preparation of a tumor therapeutic drug.

Preferably, the tumor includes liver cancer, lung cancer, breast cancer, ovarian cancer, nephroblastoma, glioma, neuroblastoma, melanoma, nasopharynx cancer, mesothelioma, islet cell tumor, retinoblastoma, pancreatic cancer, uterine fibroids, cervical cancer or thyroid cancer.

Compared with the existing art, the present application has beneficial effects described below.

(1) In the present application, the Fcγ receptor extracellular domain is used as the antigen binding domain of the chimeric antigen receptor so that the prepared CAR-T cell can recognize the Fc fragment of an antibody, and achieve, when used in combination with a tumor therapeutic antibody, an ADCC effect similar to that of natural immune cells such as NK cells; even in the case that antigen loss occurs in tumor cells, the CAR-T can also clear tumor cells combined with antibodies and achieve an efficient killing effect on the tumor cells.

(2) In the present application, the antigen binding domain of the chimeric antigen receptor is a human Fcγ receptor extracellular domain that basically has no immunogenicity so that the prepared CAR-T cell has high safety and long circulation time in vivo.

(3) In the present application, a Linker region is arranged between the antigen binding domain and the transmembrane domain of the chimeric antigen receptor, ensuring that the Fcγ receptor extracellular domain that is used as the antigen binding domain is expressed on the surface of a T cell membrane and improving the recognition efficiency of an antibody Fc segment by CAR-T cells.

(4) In the present application, the chimeric antigen receptor has the advantages of simple design and simple structure, has no restriction on the types of antibodies used in combination and can be used in combination with different antibodies to recognize different tumor surface antigens, and there is no need to carry out additional modification on T cells or tumor therapeutic antibodies, which is beneficial to achieving industrial application.

DETAILED DESCRIPTION

To further elaborate on the technical means adopted and the effects achieved in the present application, the present application is described below in conjunction with examples and drawings. It is to be understood that the specific examples set forth below are intended to illustrate but not to limit the present application.

Examples without specific techniques or conditions noted are carried out according to techniques or conditions described in the literature in the art or according to the product specification. The reagents or instruments used herein without manufacturers specified are conventional products commercially available from proper channels.

Example 1 Construction of a CAR Molecule Lentiviral Vector

Figure 1:
FIG. 1 is a schematic diagram of a CAR molecule expression element.

As shown in FIG. 1, the constructed CAR molecule included a signal peptide, an Fcγ receptor extracellular domain (CD64a/b, CD32a/b, CD16a/b), a Linker region, a transmembrane domain, and a co-stimulatory molecule. The construction steps include (1) and (2).

(1) The CAR molecule composed of a signal peptide, an Fcγ receptor extracellular domain, a Linker region (Hinge region and IgG constant region), a transmembrane region and a co-stimulatory molecule was genetically synthesized, wherein the amino acid sequence of the signal peptide was any one of SEQ ID NOs: 15-18, the amino acid sequence of the Fcγ receptor extracellular domain was any one of SEQ ID NOs: 1-6, the amino acid sequence of the Hinge region was SEQ ID NO: 12, the amino acid sequence of the IgG constant region was any one of SEQ ID NOs: 13-14, the amino acid sequence of the transmembrane region was any one of SEQ ID NOs: 7-8, and the amino acid sequence of the co-stimulatory molecule was any one of SEQ ID NOs: 9-11.

For example, the CAR molecule was:

① a GM-CSF signal peptide, a CD64a extracellular domain, a Hinge region, CH3, a CD8 transmembrane domain, a 41BB intracellular domain and CD3ζ;
② an IL-2 signal peptide, a CD64b extracellular domain, a Hinge region, CH3, a CD8 ransmembrane domain, t a 41BB intracellular domain and CD3ζ;
③ a CD8a signal peptide, a CD32a extracellular domain, a Hinge region, CH2, a CD28 transmembrane domain, a CD28 intracellular domain and CD3ζ;
④ an IL-2 signal peptide, a CD16b extracellular domain, a Hinge region, CH2, a CD28 transmembrane domain, a CD28 intracellular domain and CD3ζ;
⑤ a GM-CSF signal peptide, a CD64a extracellular domain, a CD8 transmembrane domain, a 41BB intracellular domain and CD3ζ;
⑥ an IL-2 signal peptide, a CD64b extracellular domain, a CD8 transmembrane domain, a 41BB intracellular domain and CD3ζ.

(2) The synthesized CAR molecule was cloned into a lentivirus expression vector pwpxld-eGFP by PCR, enzyme digestion, recombination and other steps, specifically as follows:

PCR amplification was carried out on a PUC57 (PUC57-CAR) vector containing the CAR molecule using KOD One™ PCR Master Mix from TOYOBO. The system was shown in Table 1-1, and the reaction conditions were shown in Table 1-2. The forward primer (SEQ ID NO: 19) was ctcgaggtttaaacatgtggttgacactctgc, and the reverse primer (SEQ ID NO: 20) was ggagcgacaattttactaggcggg.

Then, the pwpxld-eGFP vector was treated using the restriction enzyme FD MSSI (article No.: FD1344) and FD Bcul (article No: FD1253) from Thermo. The enzyme digestion system was shown in Table 2.

After 2 hours of enzyme digestion, 20 μL of the enzyme digested product was subjected to agarose gel electrophoresis, and the fragment with a size of about 10000 bp was harvested and recovered by HiPure Gel Pure Micro Kit from Magen.

The PCR amplification product and the linearized pWPXLd vector were subjected to a homologous recombination reaction by ClonExpress homologous recombination kit from Vazyme Biotech, and the system was shown in Table 3.

After incubation at 37° C. for 30 minutes, the reaction product was quickly placed on ice for 5 minutes, then added with 20 μL of Trans1-T1 competent cells, stood for 30 minutes, heated at 42° C. for 90 seconds, and coated on a plate to obtain the recombinant lentivirus vector.

TABLE 1-1

PCR reaction system

| Reagent | Dosage |
| --- | --- |
| PUC57-CAR | 100 ng |
| KOD One ™ PCR Master Mix | 25 μL |
| Forward primer (10 uM) | 2 μL |
| Reverse primer (10 uM) | 2 μL |
| ddH$_2$O | make up to 50 μL |

TABLE 1-2

PCR reaction conditions

| Temperature (° C.) | Time (s) | Cycle number |
| --- | --- | --- |
| 98 | 60 | 1 |
| 98 | 10 | 35 |
| 60 | 5 | |
| 68 | 10 | |
| 16 | 60 | 1 |

TABLE 2 pWPXLd vector enzyme digestion system

| Reagent | Dosage |
| --- | --- |
| pWPXLd vector | 2 ng |
| FD MSSI | 1 μL |
| FD Bcul | 1 μL |
| 10 × FD Buffer | 2 μL |
| ddH$_2$O | make up to 20 μL |

TABLE 3

Homologous recombination system

| Reagent | Dosage |
| --- | --- |
| Linearized pWPXLd vector | 200 ng |
| PUC57-CAR PCR product | 80 ng |
| 5 × Exnase Buffer | 4 μL |
| Exnase | 2 μL |
| ddH$_2$O | make up to 20 μL |

Example 2 Packaging of Recombinant Lentivirus (1) 293T cells were cultured in a 10 cm culture dish with a medium of DMEM high glucose medium+10% fetal bovine serum (FBS)+1% double antibody (100×penicillin-streptomycin mixed solution).
(2) When the density of 293T cells in the culture dish reached 80%, the medium was changed to DMEM high glucose medium+1% FBS+1% double antibody.
(3) After the cells were cultured in the changed medium for 2 hours, a transfection reagent was prepared, 500 μL of opti-DMEM was put into a 15 mL centrifuge tube, 7.2 μL of linear polyethyleneimine (PEI) with a concentration of 10 μg/μL was added, and the mixture in the tube was slightly mixed and then stood for 5 minutes.
(4) 500 μL of opti-DMEM was added to a 1.5 mL centrifuge tube, 9 μg of recombinant lentivirus vectors, 3 μg of pMD2. G auxiliary plasmids and 12 μg of psPAX were added to the centrifuge tube, the mixture in the tube was mixed evenly, added to the transfection reagent, mixed upside down, and stood for 20 minutes.
(5) The above mixed solution was all added to 293T cells, and after the cells were incubated for 6 hours, the medium was changed to 7 mL of fresh medium DMEM high glucose medium+1% FBS+1% double antibody.
(6) 24 hours after the medium change, the supernatant was collected, and the medium was changed to 7 mL of fresh medium DMEM high sugar medium+1% FBS+1% double antibody.

(7) After 24 hours, the supernatant was collected again, and the medium was changed to 7 mL of fresh medium DMEM high sugar medium+1% FBS+1% double antibody.
(8) After 24 hours, the supernatant was collected, and the cells were discarded.
(9) After the supernatant collection was completed, the supernatant was centrifuged at 2500 g for 0.5 hours and filtered with a 0.45 μm filter to obtain the recombinant lentivirus.

Example 3 Preparation of CAR-T Cells (1) After Pan T cells were isolated from cord blood, the cells were counted, and the concentration was adjusted to $1\times10^6$ cells/mL. Then 10 μL of TransAct T cell reagent from Miltenyi was added to each milliliter of cell suspension, and after 48 hours of activation, the medium was changed to a fresh medium (IMDM medium+5% FBS (fetal bovine serum)+1% double antibody (100×penicillin-streptomycin mixed solution)+IL-2).
(2) $3\times10^7$ activated T cells were centrifuged at 300 g for 5 minutes and suspended in 3 mL of medium (IMDM medium+5% FBS (fetal bovine serum)+1% double antibody (100×penicillin-streptomycin mixed solution)).
(3) 3 mL of T cell suspension was inoculated in a 6-well plate, 1 mL per well.
(4) The packed recombinant lentivirus was added to the 6-well plate, 9 mL per well.
(5) 10 μL of polybrene was added to each well.
(6) After 8 hours of culture, the medium was changed to 1 mL of fresh medium (IMDM medium+10% FBS (fetal bovine serum)+1% double antibody (100×penicillin-streptomycin mixed solution)), and 9 mL of recombinant lentivirus was added.
(7) 10 μL of polybrene was added to each well.
(8) After 5 hours, the virus was removed, and the medium was changed to 4 mL of fresh medium (IMDM medium+10% FBS (fetal bovine serum)+1% double antibody (100×penicillin-streptomycin mixed solution)).
(9) After 48 hours, 200 μL of cell suspension was taken for flow cytometry to confirm the transduction efficiency.

Figure 2:
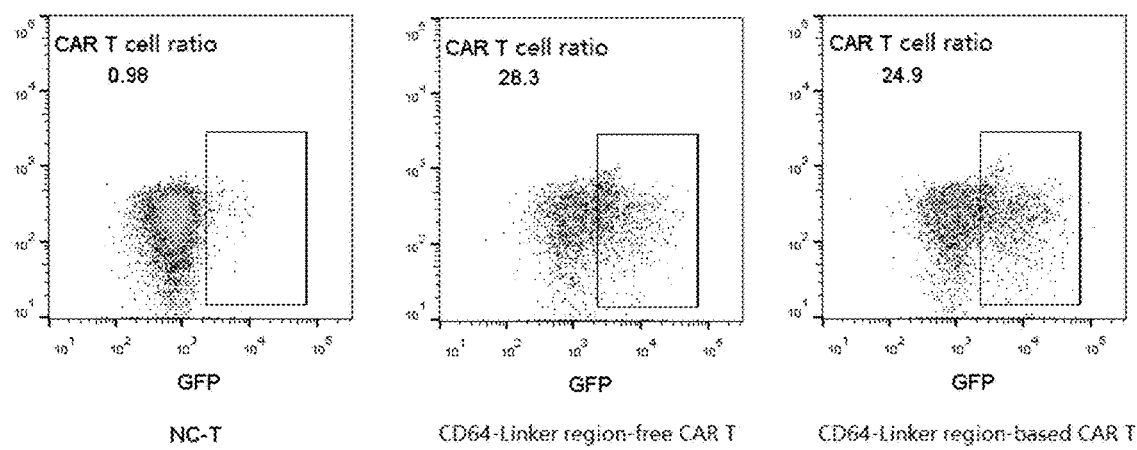
FIG. 2 shows the transduction efficiency of the CAR molecule.

Results are shown in FIG. 2 which is the flow cytometry result diagram of wild-type T cells (NC-T), CD64-Linker region-free CAR-T cells and CD64-Linker region-based CAR-T cells, which shows that the CAR molecules were highly expressed on the surface of T cells.

Example 4 Antitumor Effect of CAR-T Cells In Vitro (1) The wild-type T cells (NC-T), CD64-Linker region-free CAR-T cells, CD64-Linker region-based CAR-T cells and SKBR3 cells (breast cancer cell line) expressing luciferase were counted, respectively.
(2) The required number of T cells was calculated according to the transduction efficiency, and the ratio was adjusted with wild-type T cells (NC-T).
(3) 100 μL of medium was added to a 96-well plate, then 100 μL of T cell suspension was added to the 96-well plate, with 3 replicates per group, and then gradient dilution was performed (the ratio of initial T cells to tumor cells (E: T) was 2:1).
(4) 50 μL of tumor cells with a density of $1\times10^4$ cells/μL was added to each well.
(5) A certain amount of trastuzumab was added to each well.
(6) After 24 hours, the luciferase was diluted to the working concentration and added to the 96-well plate according to the amount of 100 μL/well.
(7) Reading was performed with a microplate reader.

Figure 3A:
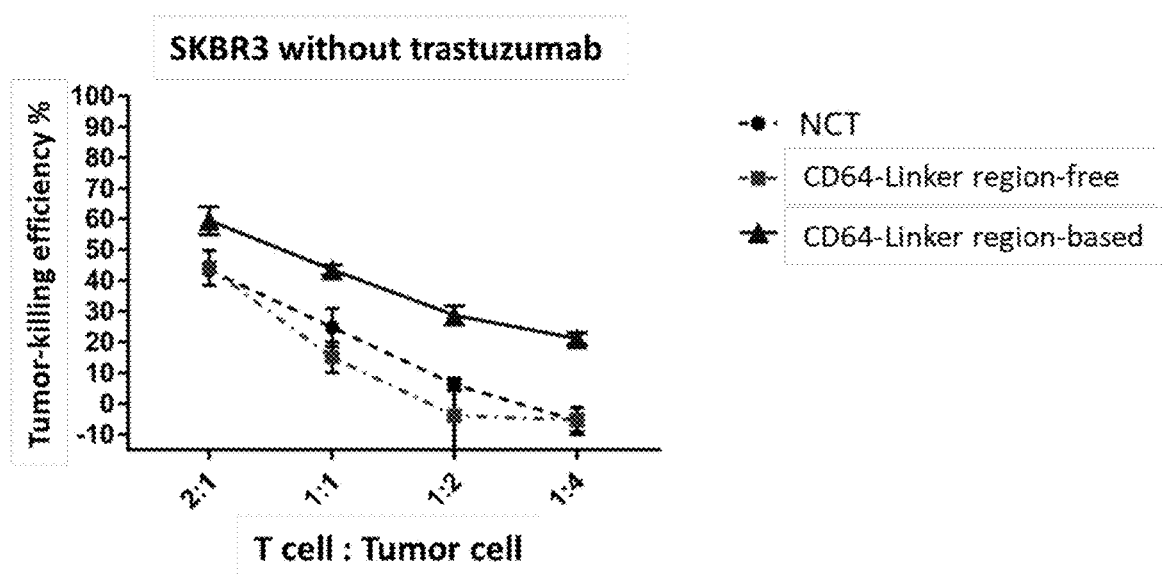
FIG. 3A shows the killing effect of the CAR-T cell in vitro under the condition of not cooperating with trastuzumab.
Figure 3B:
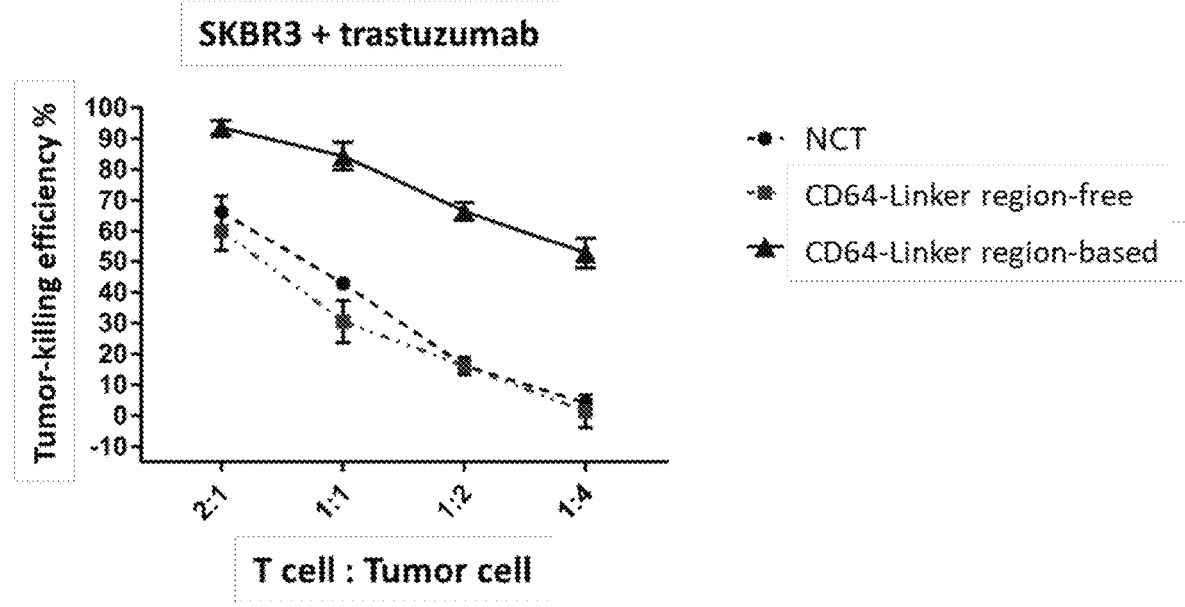
FIG. 3B shows the killing effect of the CAR-T cell in vitro under the condition of cooperating with trastuzumab.

As shown in FIG. 3A, the killing effect of wild-type T cells (NC-T) and CAR-T cells on SKBR3 cells was not significant under the condition of not cooperating with trastuzumab. As shown in FIG. 3B, when CAR-T cells cooperated with trastuzumab, Linker region-based CAR-T cells had high tumor-killing activity while the killing effect of Linker region-free CAT-T cells is not significant, and the reason is that the existence of the Linker region ensured that the Fcγ receptor extracellular domain which was used the antigen binding domain could be fully exposed to the surface of T cell membrane and improved the binding ability of the CAR-T cells to the antibody Fc segment so that the CAR-T cells could achieve an ADCC effect similar to that of natural immune cells such as NK cells and achieve an efficient killing effect on tumor cells.

Example 5 Antitumor Effect of CAR-T Cells In Vivo (1) SKOV3 cells were counted, the cell density was adjusted to $1\times10^7$/mL with normal saline, and 100 μL of SKOV3 cell suspension was injected into the right groin of an immunodeficient mouse via subcutaneous injection. After 30 days of culture, SKOV3 tumor-bearing mouse model was obtained.
(2) T cells (MOCK-T) in a negative control group, T cells in a positive control group and CD64 CAR-T cells were counted, respectively.
(3) The required number of T cells was calculated according to the transduction efficiency, and the CAR-T cell ratio was adjusted to 30%-40% with T cells (MOCK-T) in the negative control group.
(4) The cell concentration of each group was adjusted to $1\times10^8$/mL with normal saline.
(5) $1\times10^7$ cells were injected into the tail vein of each mouse.
(6) The tumor size of mice was recorded every 3 days, and the mice were sacrificed on Day 22. The tumor was dissected and retrieved, and the tumor weight was weighed.

Figure 4A:
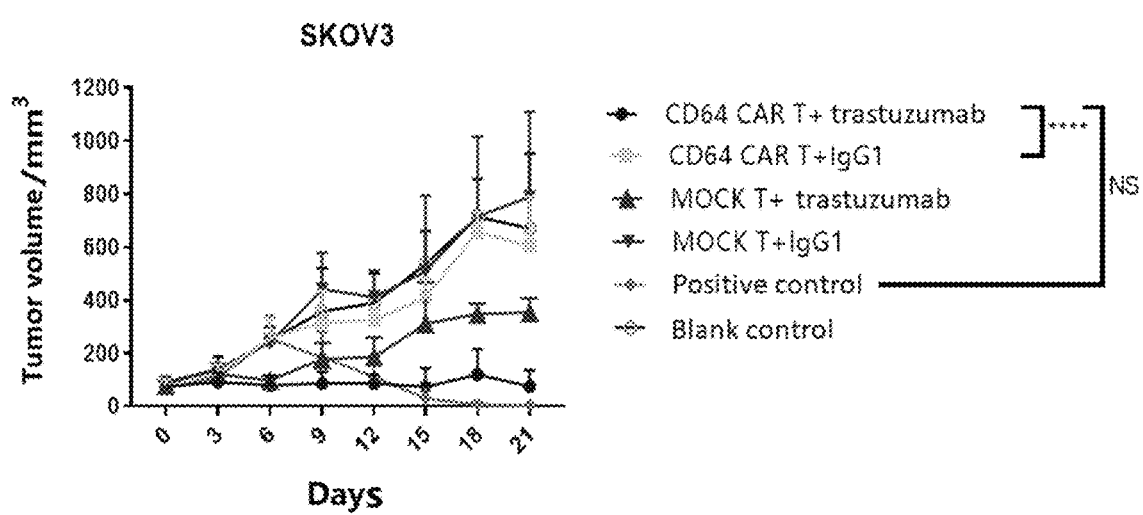
FIG. 4A shows the change curve of the tumor volume with time of different treatment groups of mice.
Figure 4B:
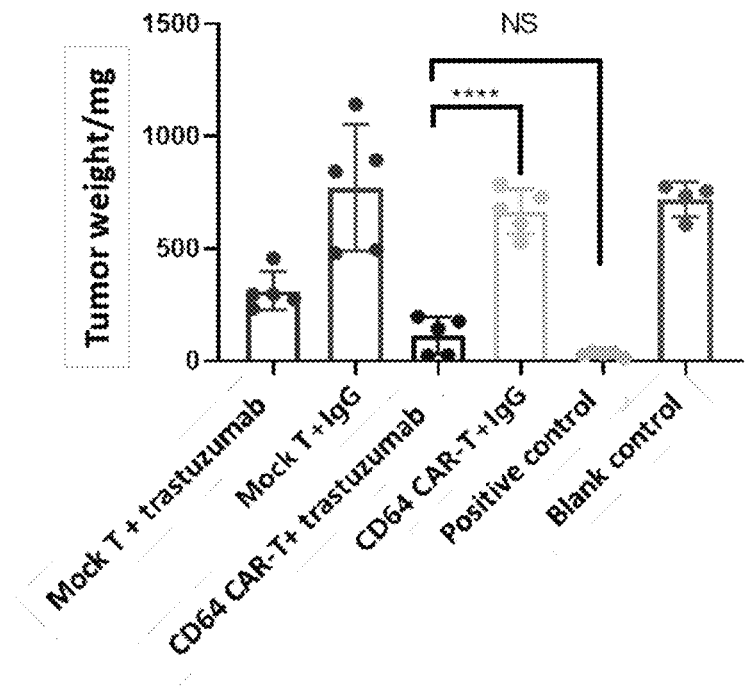
FIG. 4B shows the tumor weight of different treatment groups of mice.
Figure 4C:
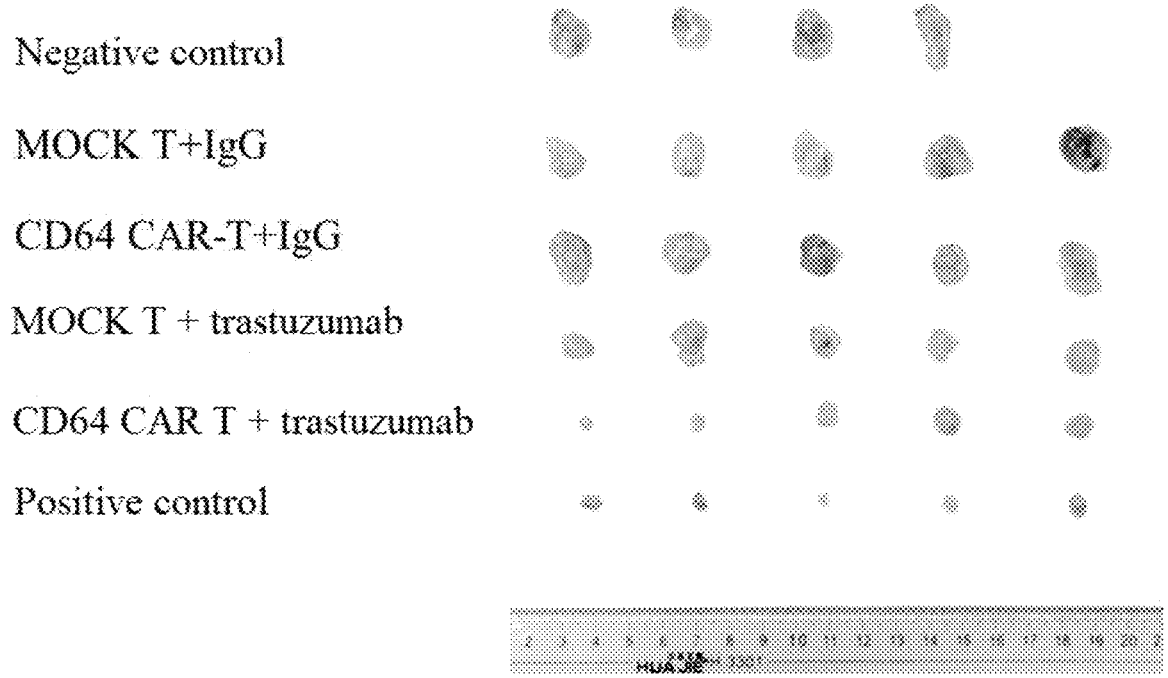
FIG. 4C shows the tumor size of different treatment groups of mice.

As shown in FIGS. 4A, 4B and 4C, CD64 CAR-T cells had no significant killing effect on tumors formed by SKOV3 under the condition of not cooperating with trastuzumab while CD64 CAR-T cells had a good clearance effect on tumors formed by SKOV3 under the condition of cooperating.

To sum up, in the present application, the Fcγ receptor extracellular domain is used as the antigen binding domain of the chimeric antigen receptor so that the prepared CAR-T cell can recognize the Fc fragment of an antibody, achieve, when used in combination with a tumor therapeutic antibody, an ADCC effect similar to that of natural immune cells such as NK cells, and achieve an efficient killing effect on the tumor cells. The antigen binding domain of the chimeric antigen receptor is a human Fcγ receptor extracellular domain that basically has no immunogenicity so that the CAR-T cell has high safety and long circulation time in vivo. A Linker region is added between the antigen binding domain and the transmembrane domain of the chimeric antigen receptor, improving the binding ability of CAR-T cells to the antibody Fc segment. The chimeric antigen receptor of the present application has the advantages of simple design and simple structure and has no restriction on the types of antibodies used in combination, which is beneficial to achieving industrial application. with trastuzumab.

The applicant has stated that although the detailed method of the present application is described through the examples described above, the present application is not limited to the detailed method described above, which means that implementation of the present application does not necessarily depend on the detailed method described above. It should be apparent to those skilled in the art that any improvements made to the present application, equivalent replacements of raw materials of the product of the present application, additions of adjuvant ingredients to the product of the present application, and selections of specific manners, etc., all fall within the protection scope and the disclosed scope of the present application.

What is claimed is:

1. A chimeric antigen receptor, comprising an antigen binding domain, a transmembrane domain, and an intracellular co-stimulatory signal transduction domain; wherein the antigen binding domain comprises an Fcγ receptor extracellular domain, wherein the Fcγ receptor extracellular domain comprises a CD64a or a CD64b extracellular domain; the chimeric antigen receptor further comprises a Linker region between the antigen binding domain and the transmembrane domain, wherein the Linker region comprises a Hinge region and an IgG constant region comprising CH2 and/or CH3 constant regions; and the transmembrane domain comprises a CD8 transmembrane domain and/or a CD28 transmembrane domain.

2. The chimeric antigen receptor according to claim 1, wherein the CD64a extracellular domain comprises an amino acid sequence as shown in SEQ ID NO:1 and the CD64b extracellular domain comprises an amino acid sequence as shown in SEQ ID NO:2.

3. The chimeric antigen receptor according to claim 1, wherein the transmembrane domain comprises a CD8 transmembrane domain or a CD28 transmembrane domain.

4. The chimeric antigen receptor according to claim 3, wherein the CD8 transmembrane domain comprises an amino acid sequence as shown in SEQ ID NO: 7; and the CD28 transmembrane domain comprises an amino acid sequence as shown in SEQ ID NO: 8.

5. The chimeric antigen receptor according to claim 1, wherein the intracellular co-stimulatory signal transduction domain comprises any one of or a combination of at least two of the following: a CD28 intracellular domain, a 41BB intracellular domain, CD3ζ, TLR2, TLR1, CD27, OX40 or DAP10.

6. The chimeric antigen receptor according to claim 5, wherein the 41BB intracellular domain comprises an amino acid sequence as shown in SEQ ID NO:9; the CD28 intracellular domain comprises an amino acid sequence as shown in SEQ ID NO: 10; and the CD3ζ comprises an amino acid sequence as shown in SEQ ID NO: 11.

7. The chimeric antigen receptor according to claim 1, wherein the Hinge region comprises an amino acid sequence as shown in SEQ ID NO: 12; the CH2 comprises an amino acid sequence as shown in SEQ ID NO: 13; the CH3 comprises an amino acid sequence as shown in SEQ ID NO: 14; and the chimeric antigen receptor further comprises a signal peptide, wherein the signal peptide comprises any one of a GM-CSF signal peptide, an IL-2 signal peptide, a CD8α signal peptide or an IL-6 signal peptide.

8. A nucleic acid molecule encoding the chimeric antigen receptor according to claim 1.

9. An expression vector, comprising the nucleic acid molecule according to claim 8.

10. A recombinant lentivirus, wherein the recombinant lentivirus is prepared by co-transfecting mammalian cells with the expression vector according to claim 9 and a packaging helper plasmid, wherein the mammalian cells comprise any one of or a combination of at least two of 293 cells, 293T cells or 293F cells.

11. A chimeric antigen receptor T cell, wherein the chimeric antigen receptor T cell expresses the chimeric antigen receptor according to claim 1.

12. A preparation method of the chimeric antigen receptor T cell according to claim 11, comprising: introducing the nucleic acid molecule into a T cell, wherein the nucleic acid molecule encodes the chimeric antigen receptor, wherein the chimeric antigen receptor comprises the antigen binding domain, the transmembrane domain, and the intracellular co-stimulatory signal transduction domain.

13. A pharmaceutical composition, comprising the chimeric antigen receptor according to claim 1.

14. A method for treating tumors, comprising administering an effective amount of the chimeric antigen receptor T cell according to claim 11 and a tumor therapeutic antibody of an IgG1 or an IgG3 type to subject in need thereof.

15. The chimeric antigen receptor according to claim 7 wherein the GM-CSF signal peptide comprises an amino acid sequence as shown in SEQ ID NO: 15; the IL-2 signal peptide comprises an amino acid sequence as shown in SEQ ID NO: 16; the CD8α signal peptide comprises an amino acid sequence as shown in SEQ ID NO: 17; and the IL-6 signal peptide comprises an amino acid sequence as shown in SEQ ID NO: 18.

16. The expression vector of claim 9, comprising any one of a lentiviral vector, a retroviral vector or an adeno-associated viral vector.

17. A pharmaceutical composition, comprising the nucleic acid molecule according to claim 8.

18. A pharmaceutical composition, comprising the expression vector according to claim 9.

19. A pharmaceutical composition, comprising the recombinant lentivirus according to claim 10.

20. A pharmaceutical composition, comprising the chimeric antigen receptor T cell according to claim 11.

21. The method according to claim 14, wherein the tumor comprises liver cancer, lung cancer, breast cancer, ovarian cancer, nephroblastoma, glioma, neuroblastoma, melanoma, nasopharynx cancer, mesothelioma, islet cell tumor, retinoblastoma, pancreatic cancer, uterine fibroids, cervical cancer or thyroid cancer.

* * * * *

SEQUENCE LISTING

```
<160> NUMBER OF SEQ ID NOS: 20

<210> SEQ ID NO 1
<211> LENGTH: 277
<212> TYPE: PRT
<213> ORGANISM: artificial sequence
<220> FEATURE:
<223> OTHER INFORMATION: FCGR1A CD64a extracellular domain

<400> SEQUENCE: 1

Gln Val Asp Thr Thr Lys Ala Val Ile Thr Leu Gln Pro Pro Trp Val
1               5                   10                  15

Ser Val Phe Gln Glu Glu Thr Val Thr Leu His Cys Glu Val Leu His
            20                  25                  30

Leu Pro Gly Ser Ser Ser Thr Gln Trp Phe Leu Asn Gly Thr Ala Thr
        35                  40                  45

Gln Thr Ser Thr Pro Ser Tyr Arg Ile Thr Ser Ala Ser Val Asn Asp
    50                  55                  60

Ser Gly Glu Tyr Arg Cys Gln Arg Gly Leu Ser Gly Arg Ser Asp Pro
65                  70                  75                  80

Ile Gln Leu Glu Ile His Arg Gly Trp Leu Leu Leu Gln Val Ser Ser
                85                  90                  95

Arg Val Phe Thr Glu Gly Glu Pro Leu Ala Leu Arg Cys His Ala Trp
            100                 105                 110

Lys Asp Lys Leu Val Tyr Asn Val Leu Tyr Tyr Arg Asn Gly Lys Ala
        115                 120                 125

Phe Lys Phe Phe His Trp Asn Ser Asn Leu Thr Ile Leu Lys Thr Asn
130                 135                 140

Ile Ser His Asn Gly Thr Tyr His Cys Ser Gly Met Gly Lys His Arg
145                 150                 155                 160

Tyr Thr Ser Ala Gly Ile Ser Val Thr Val Lys Glu Leu Phe Pro Ala
            165                 170                 175

Pro Val Leu Asn Ala Ser Val Thr Ser Pro Leu Leu Glu Gly Asn Leu
        180                 185                 190

Val Thr Leu Ser Cys Glu Thr Lys Leu Leu Leu Gln Arg Pro Gly Leu
    195                 200                 205

Gln Leu Tyr Phe Ser Phe Tyr Met Gly Ser Lys Thr Leu Arg Gly Arg
        210                 215                 220

Asn Thr Ser Ser Glu Tyr Gln Ile Leu Thr Ala Arg Arg Glu Asp Ser
225                 230                 235                 240

Gly Leu Tyr Trp Cys Glu Ala Ala Thr Glu Asp Gly Asn Val Leu Lys
                245                 250                 255

Arg Ser Pro Glu Leu Glu Leu Gln Val Leu Gly Leu Gln Leu Pro Thr
            260                 265                 270

Pro Val Trp Phe His
        275
```

<210> SEQ ID NO 2
<211> LENGTH: 198
<212> TYPE: PRT
<213> ORGANISM: artificial sequence
<220> FEATURE:
<223> OTHER INFORMATION: FCGR1B CD64b extracellular domain

<400> SEQUENCE: 2

```
Met Trp Phe Leu Thr Thr Leu Leu Trp Val Pro Val Asp Gly Gln
1               5                   10                  15

Val Asp Thr Thr Lys Ala Val Ile Thr Leu Gln Pro Pro Trp Val Ser
            20                  25                  30

Val Phe Gln Glu Glu Thr Ile Thr Leu His Cys Glu Val Leu His Leu
            35                  40                  45

Pro Gly Ser Ser Ser Thr Gln Trp Phe Leu Asn Gly Thr Ala Thr Gln
            50                  55                  60

Thr Ser Thr Pro Ser Tyr Arg Ile Thr Ser Ala Ser Val Asn Asp Ser
65              70                  75                  80

Gly Glu Tyr Arg Cys Gln Arg Gly Leu Ser Gly Arg Ser Asp Pro Ile
                85                  90                  95

Gln Leu Glu Ile His Arg Gly Trp Leu Leu Leu Gln Val Ser Ser Arg
            100                 105                 110

Val Phe Met Glu Gly Glu Pro Leu Ala Leu Arg Cys His Ala Trp Lys
            115                 120                 125

Asp Lys Leu Val Tyr Asn Val Leu Tyr Tyr Arg Asn Gly Lys Ala Phe
            130                 135                 140

Lys Phe Phe His Trp Asn Ser Asn Leu Thr Ile Leu Lys Thr Asn Ile
145                 150                 155                 160

Ser His Asn Gly Thr Tyr His Cys Ser Gly Met Gly Lys His Arg Tyr
                165                 170                 175

Thr Ser Ala Gly Ile Ser Gln Tyr Thr Val Lys Gly Leu Gln Leu Pro
            180                 185                 190

Thr Pro Val Trp Phe His
            195
```

<210> SEQ ID NO 3
<211> LENGTH: 217
<212> TYPE: PRT
<213> ORGANISM: artificial sequence
<220> FEATURE:
<223> OTHER INFORMATION: FCG2A CD32a extracellular domain

<400> SEQUENCE: 3

```
Met Thr Ala Lys Met Glu Thr Thr Phe Tyr Asp Asp Ala Leu Asn Ala
1               5                   10                  15

Ser Phe Leu Pro Ser Glu Ser Gly Pro Tyr Gly Tyr Ser Asn Pro Lys
            20                  25                  30

Ile Leu Lys Gln Ser Met Thr Leu Asn Leu Ala Asp Pro Val Gly Ser
            35                  40                  45

Leu Lys Pro His Leu Arg Ala Lys Asn Ser Asp Leu Leu Thr Ser Pro
50                  55                  60

Asp Val Gly Leu Leu Lys Leu Ala Ser Pro Glu Leu Glu Arg Leu Ile
65                  70                  75                  80

Ile Gln Ser Ser Asn Gly His Ile Thr Thr Thr Pro Thr Pro Thr Gln
                85                  90                  95

Phe Leu Cys Pro Lys Asn Val Thr Asp Glu Gln Glu Gly Phe Ala Glu
            100                 105                 110
```

Gly Phe Val Arg Ala Leu Ala Glu Leu His Ser Gln Asn Thr Leu Pro
            115                 120                 125

Ser Val Thr Ser Ala Ala Gln Pro Val Asn Gly Ala Gly Met Val Ala
        130                 135                 140

Pro Ala Val Ala Ser Val Ala Gly Gly Ser Gly Ser Gly Gly Phe Ser
145                 150                 155                 160

Ala Ser Leu His Ser Glu Pro Pro Val Tyr Ala Asn Leu Ser Asn Phe
                165                 170                 175

Asn Pro Gly Ala Leu Ser Ser Gly Gly Ala Pro Ser Tyr Gly Ala
            180                 185                 190

Ala Gly Leu Ala Phe Pro Ala Gln Pro Gln Gln Gln Gln Pro Pro
        195                 200                 205

His His Leu Pro Gln Gln Met Pro Val
            210                 215

<210> SEQ ID NO 4
<211> LENGTH: 217
<212> TYPE: PRT
<213> ORGANISM: artificial sequence
<220> FEATURE:
<223> OTHER INFORMATION: FCG2B CD32b extracellular domain

<400> SEQUENCE: 4

Met Gly Ile Leu Ser Phe Leu Pro Val Leu Ala Thr Glu Ser Asp Trp
1               5                   10                  15

Ala Asp Cys Lys Ser Pro Gln Pro Trp Gly His Met Leu Leu Trp Thr
            20                  25                  30

Ala Val Leu Phe Leu Ala Pro Val Ala Gly Thr Pro Ala Ala Pro Pro
        35                  40                  45

Lys Ala Val Leu Lys Leu Glu Pro Gln Trp Ile Asn Val Leu Gln Glu
    50                  55                  60

Asp Ser Val Thr Leu Thr Cys Arg Gly Thr His Ser Pro Glu Ser Asp
65                  70                  75                  80

Ser Ile Gln Trp Phe His Asn Gly Asn Leu Ile Pro Thr His Thr Gln
                85                  90                  95

Pro Ser Tyr Arg Phe Lys Ala Asn Asn Asn Asp Ser Gly Glu Tyr Thr
            100                 105                 110

Cys Gln Thr Gly Gln Thr Ser Leu Ser Asp Pro Val His Leu Thr Val
        115                 120                 125

Leu Ser Glu Trp Leu Val Leu Gln Thr Pro His Leu Glu Phe Gln Glu
    130                 135                 140

Gly Glu Thr Ile Val Leu Arg Cys His Ser Trp Lys Asp Lys Pro Leu
145                 150                 155                 160

Val Lys Val Thr Phe Phe Gln Asn Gly Lys Ser Lys Lys Phe Ser Arg
                165                 170                 175

Ser Asp Pro Asn Phe Ser Ile Pro Gln Ala Asn His Ser His Ser Gly
            180                 185                 190

Asp Tyr His Cys Thr Gly Asn Ile Gly Tyr Thr Leu Tyr Ser Ser Lys
        195                 200                 205

Pro Val Thr Ile Thr Val Gln Ala Pro
    210                 215

<210> SEQ ID NO 5
<211> LENGTH: 208
<212> TYPE: PRT
<213> ORGANISM: artificial sequence

```
<220> FEATURE:
<223> OTHER INFORMATION: FCG3A CD16a extracellular domain

<400> SEQUENCE: 5

Met Trp Gln Leu Leu Leu Pro Thr Ala Leu Leu Leu Val Ser Ala
1               5                   10                  15

Gly Met Arg Thr Glu Asp Leu Pro Lys Ala Val Val Phe Leu Glu Pro
            20                  25                  30

Gln Trp Tyr Arg Val Leu Glu Lys Asp Ser Val Thr Leu Lys Cys Gln
            35                  40                  45

Gly Ala Tyr Ser Pro Glu Asp Asn Ser Thr Gln Trp Phe His Asn Glu
        50                  55                  60

Ser Leu Ile Ser Ser Gln Ala Ser Ser Tyr Phe Ile Asp Ala Ala Thr
65                  70                  75                  80

Val Asp Asp Ser Gly Glu Tyr Arg Cys Gln Thr Asn Leu Ser Thr Leu
                85                  90                  95

Ser Asp Pro Val Gln Leu Glu Val His Ile Gly Trp Leu Leu Leu Gln
            100                 105                 110

Ala Pro Arg Trp Val Phe Lys Glu Glu Asp Pro Ile His Leu Arg Cys
        115                 120                 125

His Ser Trp Lys Asn Thr Ala Leu His Lys Val Thr Tyr Leu Gln Asn
    130                 135                 140

Gly Lys Gly Arg Lys Tyr Phe His His Asn Ser Asp Phe Tyr Ile Pro
145                 150                 155                 160

Lys Ala Thr Leu Lys Asp Ser Gly Ser Tyr Phe Cys Arg Gly Leu Phe
                165                 170                 175

Gly Ser Lys Asn Val Ser Ser Glu Thr Val Asn Ile Thr Ile Thr Gln
            180                 185                 190

Gly Leu Ala Val Ser Thr Ile Ser Ser Phe Phe Pro Pro Gly Tyr Gln
        195                 200                 205

<210> SEQ ID NO 6
<211> LENGTH: 200
<212> TYPE: PRT
<213> ORGANISM: artificial sequence
<220> FEATURE:
<223> OTHER INFORMATION: FCG3B CD16b extracellular domain

<400> SEQUENCE: 6

Met Trp Gln Leu Leu Leu Pro Thr Ala Leu Leu Leu Val Ser Ala
1               5                   10                  15

Gly Met Arg Thr Glu Asp Leu Pro Lys Ala Val Val Phe Leu Glu Pro
            20                  25                  30

Gln Trp Tyr Ser Val Leu Glu Lys Asp Ser Val Thr Leu Lys Cys Gln
            35                  40                  45

Gly Ala Tyr Ser Pro Glu Asp Asn Ser Thr Gln Trp Phe His Asn Glu
        50                  55                  60

Asn Leu Ile Ser Ser Gln Ala Ser Ser Tyr Phe Ile Asp Ala Ala Thr
65                  70                  75                  80

Val Asn Asp Ser Gly Glu Tyr Arg Cys Gln Thr Asn Leu Ser Thr Leu
                85                  90                  95

Ser Asp Pro Val Gln Leu Glu Val His Ile Gly Trp Leu Leu Leu Gln
            100                 105                 110

Ala Pro Arg Trp Val Phe Lys Glu Glu Asp Pro Ile His Leu Arg Cys
        115                 120                 125

His Ser Trp Lys Asn Thr Ala Leu His Lys Val Thr Tyr Leu Gln Asn
```

```
                130                 135                 140
Gly Lys Asp Arg Lys Tyr Phe His His Asn Ser Asp Phe His Ile Pro
145                 150                 155                 160

Lys Ala Thr Leu Lys Asp Ser Gly Ser Tyr Phe Cys Arg Gly Leu Val
                165                 170                 175

Gly Ser Lys Asn Val Ser Ser Glu Thr Val Asn Ile Thr Ile Thr Gln
                180                 185                 190

Gly Leu Ala Val Ser Thr Ile Ser
                195                 200

<210> SEQ ID NO 7
<211> LENGTH: 24
<212> TYPE: PRT
<213> ORGANISM: artificial sequence
<220> FEATURE:
<223> OTHER INFORMATION: CD8 transmembrane domain

<400> SEQUENCE: 7

Ile Tyr Ile Trp Ala Pro Leu Ala Gly Thr Cys Gly Val Leu Leu Leu
1               5                   10                  15

Ser Leu Val Ile Thr Leu Tyr Cys
                20

<210> SEQ ID NO 8
<211> LENGTH: 66
<212> TYPE: PRT
<213> ORGANISM: artificial sequence
<220> FEATURE:
<223> OTHER INFORMATION: CD28 transmembrane domain

<400> SEQUENCE: 8

Ile Glu Val Met Tyr Pro Pro Pro Tyr Leu Asp Asn Glu Lys Ser Asn
1               5                   10                  15

Gly Thr Ile Ile His Val Lys Gly Lys His Leu Cys Pro Ser Pro Leu
                20                  25                  30

Phe Pro Gly Pro Ser Lys Pro Phe Trp Val Leu Val Val Val Gly Gly
            35                  40                  45

Val Leu Ala Cys Tyr Ser Leu Leu Val Thr Val Ala Phe Ile Ile Phe
        50                  55                  60

Trp Val
65

<210> SEQ ID NO 9
<211> LENGTH: 42
<212> TYPE: PRT
<213> ORGANISM: artificial sequence
<220> FEATURE:
<223> OTHER INFORMATION: 41BB intracellular domain

<400> SEQUENCE: 9

Lys Arg Gly Arg Lys Lys Leu Leu Tyr Ile Phe Lys Gln Pro Phe Met
1               5                   10                  15

Arg Pro Val Gln Thr Thr Gln Glu Glu Asp Gly Cys Ser Cys Arg Phe
                20                  25                  30

Pro Glu Glu Glu Glu Gly Gly Cys Glu Leu
            35                  40

<210> SEQ ID NO 10
<211> LENGTH: 41
<212> TYPE: PRT
<213> ORGANISM: artificial sequence
```

```
<220> FEATURE:
<223> OTHER INFORMATION: CD28 intracellular domain

<400> SEQUENCE: 10

Arg Ser Lys Arg Ser Arg Leu Leu His Ser Asp Tyr Met Asn Met Thr
1               5                   10                  15

Pro Arg Arg Pro Gly Pro Thr Arg Lys His Tyr Gln Pro Tyr Ala Pro
            20                  25                  30

Pro Arg Asp Phe Ala Ala Tyr Arg Ser
            35                  40

<210> SEQ ID NO 11
<211> LENGTH: 112
<212> TYPE: PRT
<213> ORGANISM: artificial sequence
<220> FEATURE:
<223> OTHER INFORMATION: CD3zeta

<400> SEQUENCE: 11

Arg Val Lys Phe Ser Arg Ser Ala Asp Ala Pro Ala Tyr Gln Gln Gly
1               5                   10                  15

Gln Asn Gln Leu Tyr Asn Glu Leu Asn Leu Gly Arg Arg Glu Glu Tyr
            20                  25                  30

Asp Val Leu Asp Lys Arg Arg Gly Arg Asp Pro Glu Met Gly Gly Lys
        35                  40                  45

Pro Arg Arg Lys Asn Pro Gln Glu Gly Leu Tyr Asn Glu Leu Gln Lys
    50                  55                  60

Asp Lys Met Ala Glu Ala Tyr Ser Glu Ile Gly Met Lys Gly Glu Arg
65                  70                  75                  80

Arg Arg Gly Lys Gly His Asp Gly Leu Tyr Gln Gly Leu Ser Thr Ala
                85                  90                  95

Thr Lys Asp Thr Tyr Asp Ala Leu His Met Gln Ala Leu Pro Pro Arg
            100                 105                 110

<210> SEQ ID NO 12
<211> LENGTH: 9
<212> TYPE: PRT
<213> ORGANISM: artificial sequence
<220> FEATURE:
<223> OTHER INFORMATION: Hinge

<400> SEQUENCE: 12

Gly Gly Gly Ser Ser Gly Gly Gly Ser
1               5

<210> SEQ ID NO 13
<211> LENGTH: 110
<212> TYPE: PRT
<213> ORGANISM: artificial sequence
<220> FEATURE:
<223> OTHER INFORMATION: Constant Heavy 2 (CH2)

<400> SEQUENCE: 13

Ala Pro Glu Phe Leu Gly Gly Pro Ser Val Phe Leu Phe Pro Pro Lys
1               5                   10                  15

Pro Lys Asp Thr Leu Met Ile Ser Arg Thr Pro Glu Val Thr Cys Val
            20                  25                  30

Val Val Asp Val Ser Gln Glu Asp Pro Glu Val Gln Phe Asn Trp Tyr
        35                  40                  45

Val Asp Gly Val Glu Val His Asn Ala Lys Thr Lys Pro Arg Glu Glu
    50                  55                  60
```

```
Gln Phe Asn Ser Thr Tyr Arg Val Val Ser Val Leu Thr Val Leu His
 65                  70                  75                  80

Gln Asp Trp Leu Asn Gly Lys Glu Tyr Lys Cys Lys Val Ser Asn Lys
                 85                  90                  95

Gly Leu Pro Ser Ser Ile Glu Lys Thr Ile Ser Lys Ala Lys
            100                 105                 110
```

<210> SEQ ID NO 14
<211> LENGTH: 108
<212> TYPE: PRT
<213> ORGANISM: artificial sequence
<220> FEATURE:
<223> OTHER INFORMATION: CH3

<400> SEQUENCE: 14

```
Gly Gly Gln Pro Arg Glu Pro Gln Val Tyr Thr Leu Pro Pro Ser Arg
  1               5                  10                  15

Asp Glu Leu Thr Lys Asn Gln Val Ser Leu Thr Cys Leu Val Lys Gly
                 20                  25                  30

Phe Tyr Pro Ser Asp Ile Ala Val Glu Trp Glu Ser Asn Gly Gln Pro
             35                  40                  45

Glu Asn Asn Tyr Lys Thr Thr Pro Pro Val Leu Asp Ser Asp Gly Ser
 50                  55                  60

Phe Phe Leu Tyr Ser Lys Leu Thr Val Asp Lys Ser Arg Trp Gln Gln
 65                  70                  75                  80

Gly Asn Val Phe Ser Cys Ser Val Met His Glu Ala Leu His Asn His
                 85                  90                  95

Tyr Thr Gln Lys Ser Leu Ser Leu Ser Pro Gly Lys
            100                 105
```

<210> SEQ ID NO 15
<211> LENGTH: 20
<212> TYPE: PRT
<213> ORGANISM: artificial sequence
<220> FEATURE:
<223> OTHER INFORMATION: GM-CSF signal peptide

<400> SEQUENCE: 15

```
Met Glu Thr Asp Thr Leu Leu Leu Trp Val Leu Leu Leu Trp Val Pro
  1               5                  10                  15

Gly Ser Thr Gly
            20
```

<210> SEQ ID NO 16
<211> LENGTH: 20
<212> TYPE: PRT
<213> ORGANISM: artificial sequence
<220> FEATURE:
<223> OTHER INFORMATION: IL-2 signal peptide

<400> SEQUENCE: 16

```
Met Tyr Arg Met Gln Leu Leu Ser Cys Ile Ala Leu Ser Leu Ala Leu
  1               5                  10                  15

Val Thr Asn Ser
            20
```

<210> SEQ ID NO 17
<211> LENGTH: 21
<212> TYPE: PRT
<213> ORGANISM: artificial sequence
<220> FEATURE:

```
<223> OTHER INFORMATION: CD8alpha signal peptide

<400> SEQUENCE: 17

Met Ala Leu Pro Val Thr Ala Leu Leu Leu Pro Leu Ala Leu Leu Leu
1               5                   10                  15

His Ala Ala Arg Pro
            20

<210> SEQ ID NO 18
<211> LENGTH: 29
<212> TYPE: PRT
<213> ORGANISM: artificial sequence
<220> FEATURE:
<223> OTHER INFORMATION: IL-6 signal peptide

<400> SEQUENCE: 18

Met Asn Ser Phe Ser Thr Ser Ala Phe Gly Pro Val Ala Phe Ser Leu
1               5                   10                  15

Gly Leu Leu Val Leu Pro Ala Ala Phe Pro Ala Pro
            20                  25

<210> SEQ ID NO 19
<211> LENGTH: 36
<212> TYPE: DNA
<213> ORGANISM: artificial sequence
<220> FEATURE:
<223> OTHER INFORMATION: primer

<400> SEQUENCE: 19
ctcgaggttt aaacatgtgg ttcttgacaa ctctgc                              36

<210> SEQ ID NO 20
<211> LENGTH: 34
<212> TYPE: DNA
<213> ORGANISM: artificial sequence
<220> FEATURE:
<223> OTHER INFORMATION: primer

<400> SEQUENCE: 20
ggagcgacaa ttttactagt gcgaggggc aggg                                 34
```